United States Patent Office 3,396,978
Patented Aug. 13, 1968

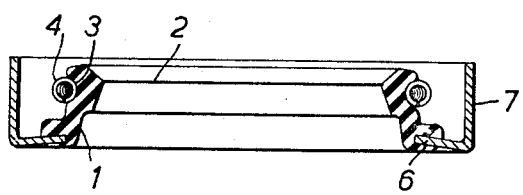

3,396,978
SHAFT SEALS
Mark Balkin, Denys G. Turner, and Kenneth Irving, Newcastle-upon-Tyne, England, assignors to George Angus & Company Limited, Newcastle-upon-Tyne, England
Filed June 23, 1965, Ser. No. 466,380
Claims priority, application Great Britain, June 30, 1964, 26,977/64
9 Claims. (Cl. 277—153)

ABSTRACT OF THE DISCLOSURE

Lip type shaft seals, and free-flowing vulcanizable rubber compositions for preparing same, are made from vulcanizable rubber compositions which contain: from 75 to 90 parts by weight of butadiene-acrylonitrile rubber which contains 25 to 35% by weight of acrylonitrile; from 10 to 25% parts weight of polyvinyl chloride; from 70 to 150 parts by weight of an inert particulate filler of the type conventionally used in vulcanizable rubber compositions, at least 80% by weight of which has a particle size of not less than 100 millimicrons; and conventional amounts of conventional additives such as plasticizers, accelerators, antioxidant, vulcanizers and the like.

---

This invention relates to shaft seals, also known as "oil seals," which are sealing rings used, around shafts in mechanical apparatus, for preventing fluid leakage and passage of dirt along the shafts.

The invention is concerned with so-called "lip type" shaft seals in which the sealing rings each have a flexible peripheral flange or "lip" which bears resiliently with a wiping contact against a relatively movable surface of a shaft, housing or other part. Often, the flange or lip has a garter spring to increase its wiping contact pressure.

The sealing rings of most lip type shaft seals are moulded from rubber, usually oil-resistant synthetic rubber.

The most suitable rubber material so far used for lip type shaft seals has been a synthetic rubber composition based on butadiene acrylic nitrile copolymer synthetic rubber known as, and hereinafter referred to as, "nitrile rubber." The basic nitrile rubber is, as is well known, compounded with fillers, softeners, vulcanising and other agents or additives, to suit various requirements, and forms a plastic composition which is moulded and vulcanised under heat and pressure, to the required shape.

Although shaft seals of nitrile rubber compositions have proved reasonably satisfactory for many years, the requirements for highly efficient and reliable seals in mechanical equipment, for example, in rotor vehicles and aircraft, under extremes of operating and climate conditions are becoming more and more exacting and difficult to meet with known nitrile rubber compositions.

A satisfactory composition for the moulding of lip type shaft seals should be able to satisfy most if not all of the following requirements and purposes:

Mixing and extruding or calendering in preparation of the material in a form for loading or charging into moulding dies.

Bonding to metal inserts, which are frequently used.

Clean and sharp mouldings, without contamination of the dies and with easy discharge therefrom when hot.

Moulding, with consistent mould shrinkage, to precise dimensions.

Mouldings which can be ground or knifed accurately to form the sealing lips or the surfaces or edges thereof.

Mouldings which have a good surface finish, are resistant to abrasion and not liable to abrade the relatively movable surfaces contacted in use.

Mouldings of a given hardness, to seal by wiping contact and retain a spring, when used, and which have flexibility and resilience to maintain wiping contact despite shaft eccentricity.

Mouldings with good high and low thermal resistance, for example, from 120° C. to −40° C.

Mouldings with good oil resistance, against both swelling and shrinkage.

Economic manufacture in large quantities.

To provide a composition which meets the optimum of each of the above requirements is very difficult and usually a compromise must be made to balance conflicting requirements and obtain the best practicable all-round result. For example, it is particularly difficult to reconcile maximum oil resistance with good resistance to low temperatures. With nitrile rubbers, it is well known that the higher the acrylonitrile content the better the resistance to oil but the greater the tendency to stiffening at low temperatures. Retention of flexibility when cold, down to about −40° C., can be obtained only by accepting greater swelling in oil at temperatures of 70° C. to 100° C.

Even when a compromise is reached on the above requirements, there still remains the major need that the seal must be efficient in use. In practice this cannot be predicted because it is still not known what material properties control sealing efficiency. Many theories have been advanced but it is still necessary to test seals of different sizes under service conditions over ranges of temperature, speed and other physical conditions with oils of different chemical composition, viscosity and other properties.

Many apparently suitable compositions fail on test of seals made from them and it becomes necessary to compromise on sealing efficiency. For example, limits of operating temperature range must be accepted or sealing standards have to be relaxed.

In spite of many years of research on shaft seals, the formulation of a suitable moulding composition which will give good seals is still, to a substantial extent, empirical. So much is this the case that users of large quantities of shaft seals use special test equipment and stipulate test acceptance conditions which are becoming more and more severe.

The present invention arises from research involving the preparation and testing of hundreds of compositions for moulding shaft seals and provides a composition which meets the requirements of production, operating conditions and sealing efficiency to a remarkably high degree.

According to the invention, a lip type shaft seal is moulded from a composition having the following general formulation, in proportions by weight:

A.—Rubber, containing butadiene acrylonitrile copolymer and of which 25% to 35% is acrylonitrile __ 75% to 90%
B.—Polyvinyl chloride __ 10% to 25% } of 100 parts.
C.—Inert particulate filler of which at least 80% has a particle size not less than 100 millimicrons _____ 70 to 150 parts.
D.—Vulcanising, plasticising and other agents or additives as required to make up a vulcanisable plastic composition.

In the above general formulation, the component A may be entirely butadiene acrylonitrile copolymer or this rubber may be diluted or extended by the incorporation of one or more other rubbers, such as natural rubber, butadiene-styrene copolymer, polybutadiene and polyisoprene, provided that the acrylonitrile content of the total rubber is 25% to 35%. The preferred proportion of acrylonitrile is 28%.

The component C is preferably carbon black of the type known as "Medium Thermal Black" with an average particle size of 270 to 500 millimicrons or "Fine Thermal Black" with an average particle size of 150 to 225 millimicrons. The characteristic feature of these carbon blacks is their relatively large particle size, most carbon blacks used as fillers in rubber compositions having a particle size of less than 100 millimicrons. The use of a relatively coarse filler is therefore an unusual and unexpected feature of the composition in accordance with the present invention. A minor proportion, not more than 20%, of the filler may have a particle size of less than 100 millimicrons and this is acceptable, the inclusion of some relatively fine particles being almost inevitable in the commercial grading of particulate materials.

Mineral fillers other than carbon may be used, for example, calcium carbonate or clay, in the particle sizes stated above, and mixtures of fillers may be used.

The preferred proportion of the filler, compound C, is 110 parts to 100 parts of components A plus B.

Particulars of six Examples 1–6 will now be given, of which Examples 1, 2 and 3 represent compositions in accordance with the invention, from which efficient lip type shaft seals may consistently be moulded, while Examples 4, 5 and 6 represent compositions which are unsatisfactory for the manufacture of oil seals, for the reasons stated.

in having poor sealing efficiency. Example 5 was found to swell excessively in the oil resistance test.

In the preparation of the above compositions, the usual technique for rubber mixes was followed, the components A and B (where present) first being mixed together and the other ingredients added and thoroughly dispersed in conventional rubber-mixing equipment.

Alternatively, the components A and B may be preblended, such as on a two-roll mill or in an internal mixer, or mixed as aqueous dispersions followed by coagulation and drying.

Compositions, in accordance with the invention not only meet the stated requirements for highly efficient lip type shaft seals but they have another property which is an important advantage in the actual production of the seals.

This property is that the composition can readily be granulated, i.e., reduced to particulate form, and remains free-flowing without the tendency for the particles to stick together such as is found with previous granulated rubber compositions.

Moreover, in the process of moulding, the particles blend together completely and produce homogeneous mouldings free from the granular structure which has been a defect of previous mouldings from granular compositions.

| Examples | Parts by weight | | | | | |
|---|---|---|---|---|---|---|
| | 1 | 2 | 3 | 4 | 5 | 6 |
| A Butadiene-acrylonitrile copolymer: | | | | | | |
| 28% acrylonitrile | 80 | | 60 | 67 | 67 | 80 |
| 40% acrylonitrile | | 60 | 30 | 33 | 33 | |
| Butadiene-styrene copolymer | | 25 | | | | |
| B Polyvinyl chloride | 20 | 15 | 10 | | | 20 |
| C Filler: | | | | | | |
| Carbon Black: | | | | | | |
| Medium thermal | 110 | 110 | 80 | 110 | | |
| High abrasion furnace | | | | | 60 | 50 |
| Calcium Carbonate | | | 40 | | | |
| D Additives: | | | | | | |
| Sulphur | 1 | 1 | 1 | 1 | 1 | 1 |
| Zinc Oxide | 5 | 5 | 5 | 5 | 5 | 5 |
| Stearic Acid | 1 | 1 | 1 | 1 | 1 | 1 |
| Antioxidant (phenyl beta naphthylamine) | 2 | 2 | 2 | 2 | 2 | 2 |
| Plasticiser (dioctyl sebacate) | 10 | 10 | 10 | 10 | | 10 |
| Accelerator: | | | | | | |
| Mercaptobenzthiazole | 1.2 | 1.2 | 1.2 | 1.2 | 1.2 | 1.2 |
| Tetramethylthiuram disulphide | 0.4 | 0.4 | 0.4 | 0.4 | 0.4 | 0.4 |
| Vulcanised 20 minutes at 154° C., Hardness BS° | 77 | 75 | 74 | 62 | 76 | 75 |
| Brittle Point, ° C. | −44 | −41 | −41 | −50 | −53 | −50 |
| Oil Resistance, ASTM No. 3 Oil, 70 hrs. 100° C. Vol. Change, percent | +10 | +11 | +8.5 | +6 | +17 | +12 |
| Sealing efficiency | Exc. | Exc. | Exc. | Poor | Poor | Poor |

In Example 1 the nitrile rubber constituent A consisted solely of a butadiene-acrylonitrile copolymer including 28% acrylonitrile. In Example 2 the constituent A consisted of a blend of a 40% butadiene-acrylonitrile copolymer with a butadiene-styrene copolymer, the blend containing a total proportion of 28.2% acrylonitrile. In Example 3 the constituent A consisted of a blend of 28% and 40% butadiene-acrylonitrile copolymer, the blend containing a total proportion of 32% acrylonitrile. This Example 3 also contained a proportion of calcium carbonate filler of the same particle size as previously referred to for the carbon black, i.e., between 270 and 500 millimicrons. It will be noted that Examples 4 and 5 contained no polyvinyl chloride, which is an essential constituent of the invention, while Example 6, although including both nitrile rubber and polyvinyl chloride, contained a high abrasion furnace type of carbon black with a very fine particle size outside the range of the invention.

Example 1 is the most preferred composition. It has good oil resistance, excellent sealing efficiency, considerable hardness, and adequate resistance to low temperatures. Examples 2 and 3 are also satisfactory, having adequate oil resistance, hardness, and low temperature resistance, with excellent sealing efficiency. All these compositions have good moulding, and mixing properties, bond well to metal, and have good surface finish and adequate resistance to abrasion.

Examples 4, 5 and 6 are unsatisfactory in particular

According to a further feature of the present invention therefore, a method of moulding lip type shaft seals comprises preparing a composition as defined above in accordance with the general or preferred formulation, granulating the composition and moulding the seals from the granulated composition.

By "granulating" is meant reduction of the composition to particulate form, such as by extrusion and cutting, or chopping or mincing.

The particle size of the granulated composition will depend to some extent on the size of the seals to be moulded, the larger the seal diameter the larger the granular particles which can be used. A practical lower limit of average particle size is probably about 0.5 mm. (millimetre) and an upper limit about 10.0 mm. For seals in the commonest sizes, say up to 3 inches diameter, a particle size range of 1.0 mm. to 3.0 mm. gives good results.

The granulated composition in accordance with the invention may be moulded in various ways. It may be fed or delivered, in measured amounts, to dies or may be preformed into blanks for loading into dies, such as by being pressed, or otherwise cold-formed, into slugs, pellets or intermediate blanks.

If metal-insert shaft seals are to be made, the metal inserts, suitably prepared to bond with the composition, are loaded into the dies with the granulated composition or incorporated with or in the preformed blanks.

It should be mentioned that combined nitrile rubber and polyvinyl chloride compositions are known for various purposes, particularly when resistance to ozone and oil is required.

The present invention consists in the provision of the above-defined formulation of compositions for lip type shaft seals and, in particular, the moulding of such seals from the granulated compositions.

One example of a lip type shaft seal manufactured of a composition in accordance with the invention is illustrated in the accompanying drawing which is a sectional view through an oil seal.

In the drawing the nitrile-rubber based sealing element is indicated at 1, with an internal annular sealing lip 2. The element is bonded to an inturned flange 6 of a metal sleeve 7, and the element is formed with an external groove 3 locating a surrounding garter spring 4 to reinforce the inward pressure of the lip 2 against the surface of a shaft passing through the seal. It will be understood that other constructions are possible, and that the seal may be of an external type, with a lip designed to engage the surface of a surrounding hollow part.

We claim:

1. A lip type shaft seal including an annular resilient body having an annular flexible flange with a peripheral sealing lip, said resilient body consisting essentially of a vulcanized rubber composition of:
   (a) about 75 to 90 parts by weight of rubber comprising butadiene-acrylonitrile copolymer, the acrylonitrile content of the rubber being about 25 to 35% by weight;
   (b) about 10 to 25 parts by weight of polyvinyl chloride; and
   (c) about 70 to 150 parts by weight of an inert particulate filler for vulcanized rubber compositions of which at least 80% by weight has a particle size of not less than 100 millimicrons.

2. A lip type shaft seal according to claim 1 wherein said inert filler is selected from the group consisting of carbon black, calcium carbonate, and clay and mixtures thereof.

3. A lip type shaft seal according to claim 1 wherein said inert filler comprises carbon black.

4. A lip type shaft seal according to claim 1 further including a metal sleeve bonded to said resilient body.

5. A lip type shaft seal according to claim 1 further including spring means to reinforce pressure of said sealing lip against a shaft sealed thereby.

6. A free-flowing vulcanizable molding composition comprising a plurality of discrete, free-flowing, rubber granules having a particle size of from 0.5 to 10 mm. and consisting essentially of:
   (a) about 75 to 90 parts by weight of rubber comprising butadiene-acrylonitrile copolymer, the acrylonitrile content of the rubber being about 25 to 35% by weight;
   (b) about 10 to 25 parts by weight of polyvinyl chloride; and
   (c) about 70 to 150 parts by weight of an inert particulate filler at least 80% by weight of which has a particle size of not less than 100 millimicrons and being selected from the group consisting of carbon black, calcium carbonate, clay and mixtures thereof.

7. A composition according to claim 6, the granules having a particle size of from 1 to 3 mm.

8. A method of molding shaft seals which includes an annular resilient body having an annular flexible flange with a peripheral sealing lip, said process comprising the steps of providing a free-flowing granular vulcanizable rubber composition as claimed in claim 6, and molding the composition under heat and pressure to form said shaft seal.

9. A method according to claim 8 wherein said granules of said vulcanizable composition have a particle size of from 1 to 3 mm.

References Cited
UNITED STATES PATENTS
2,412,216 12/1946 Harvey _____ 260—887
3,223,676 12/1965 Rucker _____ 260—887

FOREIGN PATENTS
676,153 12/1963 Canada.

OTHER REFERENCES
Rubber Age, vol. 55, No. 11, April 1944, page 67.
Emmett, Industrial and Engineering Chemistry, vol. 36, No. 8, August 144, pages 730–734.

ALLAN LIEBERMAN, *Primary Examiner.*